US009135086B2

(12) United States Patent
Fulkerson et al.

(10) Patent No.: US 9,135,086 B2
(45) Date of Patent: Sep. 15, 2015

(54) PERFORMING A COMPUTERIZED LANGUAGE TEACHING LESSON USING A MAIN COMPUTER AND A MOBILE DEVICE

(75) Inventors: Michael Scott Fulkerson, Harrisonburg, VA (US); Alisha Huber, Dayton, VA (US); Gregory Keim, Broadway, VA (US); Jack August Marmorstein, Harrisonburg, VA (US)

(73) Assignee: Rosetta Stone, Ltd., Harrisonburg, VA (US)

( * ) Notice: Subject to any disclaimer, the term of this patent is extended or adjusted under 35 U.S.C. 154(b) by 413 days.

(21) Appl. No.: 12/887,613

(22) Filed: Sep. 22, 2010

(65) Prior Publication Data

US 2012/0072912 A1    Mar. 22, 2012

(51) Int. Cl.
*G06F 9/54* (2006.01)

(52) U.S. Cl.
CPC ..................... *G06F 9/54* (2013.01)

(58) Field of Classification Search
None
See application file for complete search history.

(56) References Cited

U.S. PATENT DOCUMENTS

| | | | |
|---|---|---|---|
| 5,810,605 | A | 9/1998 | Siefert |
| 6,334,779 | B1 | 1/2002 | Siefert |
| 6,386,883 | B2 | 5/2002 | Siefert |
| 2006/0105313 | A1 | 5/2006 | Mansfield et al. |
| 2006/0125358 | A1* | 6/2006 | Williamson ............... 312/223.1 |
| 2006/0188860 | A1 | 8/2006 | Morrison |
| 2007/0298401 | A1* | 12/2007 | Mohanty et al. .............. 434/350 |
| 2009/0035733 | A1 | 2/2009 | Meitar et al. |
| 2009/0061407 | A1 | 3/2009 | Keim |

FOREIGN PATENT DOCUMENTS

| | | |
|---|---|---|
| CN | 101772792 A | 7/2010 |
| EP | 0710943 A2 | 8/1996 |
| EP | 0710943 A3 | 2/1997 |
| JP | 8227265 A | 9/1996 |
| JP | 1063172 A | 3/1998 |
| JP | 11231765 A | 8/1999 |
| JP | 2001202000 A | 7/2001 |
| JP | 2002196658 A | 7/2002 |
| JP | 2003248419 A | 9/2003 |
| JP | 2003345908 A | 12/2003 |
| WO | 0031710 A1 | 6/2000 |
| WO | 2009016612 A2 | 2/2009 |
| WO | 2009016612 A3 | 2/2009 |

OTHER PUBLICATIONS

International Search Report and Written Opinion, dated Feb. 15, 2012 of International Application No. PCT/US2011/52554, filed Sep. 21, 2011.

(Continued)

*Primary Examiner* — Eric C Wai

(57) ABSTRACT

A main computer runs a primary program performing an ongoing task, the primary program being optimized for performance on a desktop computer. A computerized device remote from the main computer runs an adjunct program which is a modified version of the primary program and is optimized for performance in a hands free mode. Communication means provides communication between the main computer and computerized device, and the main computer and computerized device interact through the communication means so that each influences the operation of the other.

15 Claims, 2 Drawing Sheets

(56) References Cited

OTHER PUBLICATIONS (Partner EJ900 Deluxe) Bidirectional Talking Electronic Dictionary and Audio Phrase Book [retrieved on Feb. 2, 2012]. Retrieved from the Internet: <URL:http://www.aramedia.com/ej900.htm>]. Jan. 14, 2010 [posting date retrieved from WayBackMachine] entire document.

Partner EJ900 Deluxe-Bidirectional Talking Electronic Dictionary and Audio Phrase Book, www.aramedia.com/ej900.htm, dated Jan. 14, 2010.

Office Action for Chinese Patent Application No. 201180053683.1, mailed Dec. 17, 2014 (English Translation).

Search Report for Chinese Patent Application No. 201180053683.1, mailed Dec. 9, 2014 (English Translation).

Office Action issued in Japanese Patent Application No. 2013530260, dated Jun. 30, 2015.

Koji Yui, "Drive Control Method for Portable Electronic Device," Sony Published Technical Reports, vol. 8, No. 1, Sony Corporation, Jan. 25, 1999.

* cited by examiner

PERFORMING A COMPUTERIZED LANGUAGE TEACHING LESSON USING A MAIN COMPUTER AND A MOBILE DEVICE

BACKGROUND OF THE INVENTION

The present invention relates generally to the performance of computerized tasks and, more particularly, concerns a method and system for performing an ongoing computerized task with different computerized devices.

As used herein, the term "computerized device" will be understood to include not only an actual computer, such as a personal computer, but also a pocket computer, a personal digital assistant, a smart telephone, or any other device with computing capability.

For convenience, the present invention will be disclosed in the context of a computerized teaching system. This is merely a vehicle for illustrating the invention, without the intent of limiting it.

There are many times during a busy day when it may be possible to perform computerized tasks. For example, it is not uncommon to multitask while driving by carrying on voice communications or listening to the playback of recorded memos, e-mails, or the like. Similarly, it would be desirable for student learning a language to take advantage of such time. However, it must be done without distracting him from driving, and it must be entirely hands-free.

In accordance with one aspect of the present invention, a main computer runs a primary program performing an ongoing task, the primary program being optimized for performance on a desktop computer. A computerized device remote from the main computer runs an adjunct program which is a modified version of the primary program and is optimized for performance in a hands free mode. Communication means provides communication between the main computer and computerized device, and the main computer and computerized device interact through the communication means so that each influences the operation of the other.

In a preferred embodiment, the primary program is a language teaching program performing an ongoing task which is a language teaching lesson, the main computer having stored data related to the lesson and result information related to a student's progress in the lesson. The main computer interacts with the remote computerized device to have it perform hands free tasks related to the student's performance, the remote computerized device interacts with the main computer to report the results of hands free tasks, and the main computer updates its result information based on results reported from the remote computerized device.

The foregoing technique optimizes hands free tasks on the remote computerized device, based upon performance by the student on the main computer, and vice versa. This allows lesson plans and tasks to be adapted on each device based upon performance on another device.

BRIEF DESCRIPTION OF THE DRAWINGS

The foregoing brief description and further objects, features and advantages of the present invention will be understood more completely from the following detailed description of a presciently preferred, but nonetheless illustrative, embodiment in accordance with the present invention, with a reference being had to the accompanying drawings, in which.

DETAILED DESCRIPTION OF THE PREFERRED EMBODIMENT

Figure 1:
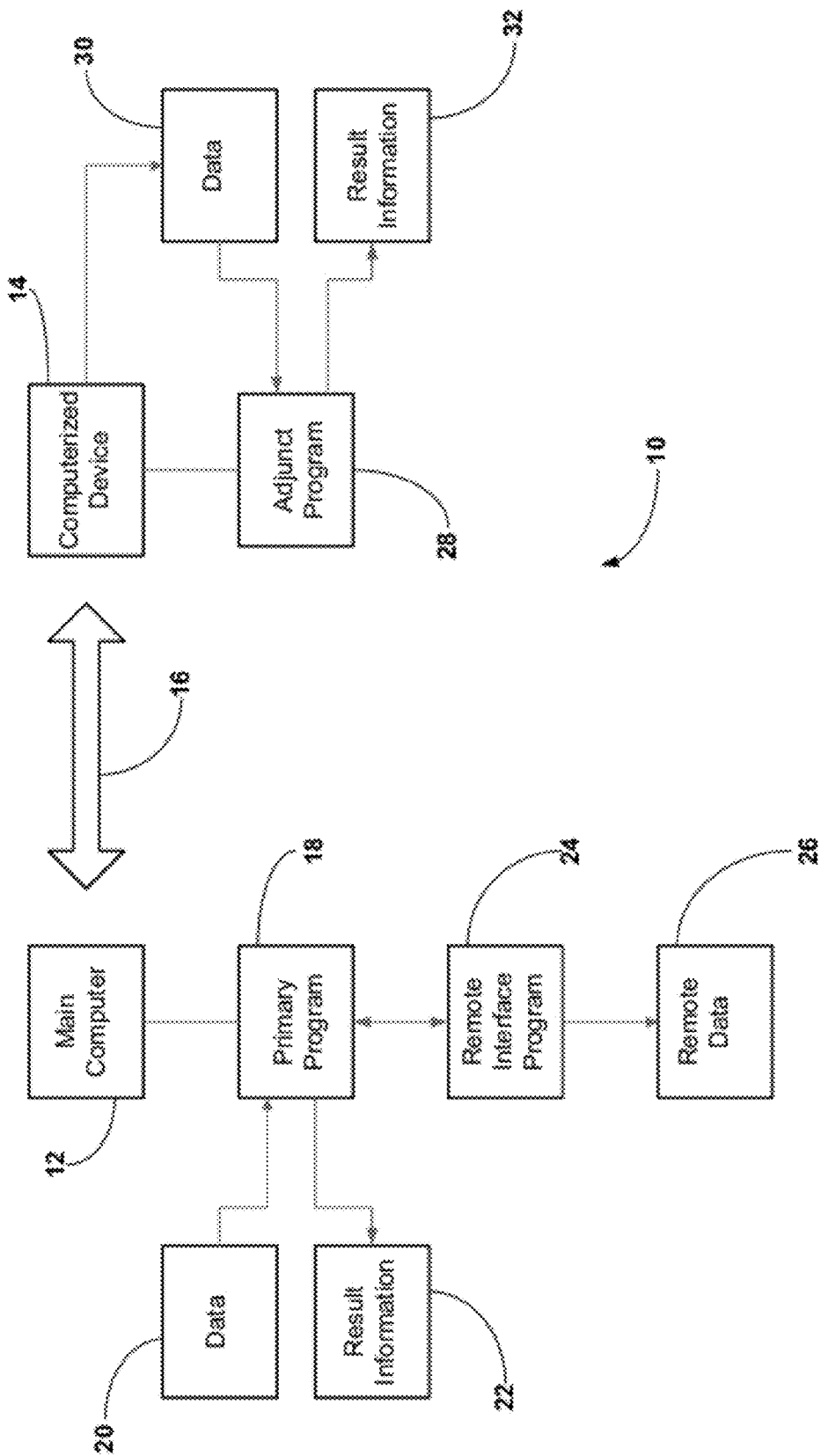
FIG. 1 is a functional block diagram illustrating a teaching system 10 embodying the present invention.

Turning now to the drawings, FIG. 1 is a functional block diagram illustrating a teaching system 10 embodying the present invention. System 10 broadly comprises a main computer 12 and a remote computerized device 14, preferably handheld, which are linked by a communication connection 16. Connection 16 may be a simple USB or Bluetooth connection, but it is contemplated that computers 12 and 14 could communicate via the Internet, with either or both being WiFi capable.

Main computer 12 has a primary program 18 running on it, in this embodiment a language teaching program being used by a student. In the embodiment, main computer 12 is a desktop personal computer. Storage available to main computer 12 contains data 20, which is all of the information necessary for the teaching program. In addition, storage available to computer 12 contains result information 22, which is a record of the progress of the language learning student. Main computer 12 contains a variety of teaching applications, the one of which that gets invoked being dependant preferably upon a student's progress as measured and stored.

Also running on main computer 12 is a remote interface program 24, which causes computer 12 and device 14 to interact when primary program 18 is started or shut down by the language student, or at specified periodic intervals, or at some other time. Upon startup of the primary program, remote program 24 updates result information 22 to reflect activity that has been carried on in remote computerized device 14. Upon shut down of primary program 18, remote interface program 24 generates remote data 26, which represents lessons that can be carried on in remote computerized device 14, as explained in more detail below. The lessons represented by remote data 26 are based upon result information 22 that was generated for the most recent language lessons. Remote interface program 24 causes remote data 26 to be transferred from main computer 12 to remote computerized device 14 via the communications connection 16.

Remote computerized device 14 is preferably a handheld device, which a language student can take with him when he leaves the site of main computer 12. Remote computerized device 14 runs an adjunct program 28, which is a simplified version of primary program 18. Storage available to remote computerized device 14 includes data 30, which is all the information necessary for adjunct program 28, including the teaching information. In addition, storage available to remote computerized device 14 contains result information 32, which is a record of the progress the language learning student has made in the teaching program represented by data 30.

As described above, remote computerized device 14 has a communications connection 16 to main computer 12 and receives remote data 26 when the language student stops his learning session or at some other time. Remote data 26 is added to and updates data 30, so that any lessons adjunct program 28 presents to the student will be affected by remote data 26. The results of those lessons will be stored in result information 32 and will update that information.

When remote computerized device 14 establishes a communication connection to main computer 14, the updated result information 32 is transferred to main computer 12 and will result in an update in result information 22. In many instances, this will result in a change in the next lesson that primary program 18 will present to the student Also, when remote program 24 next generates remote data 26, it will take into account any progress (or demonstrations of weaknesses) that the student has made in lessons performed on main computer 12 and on remote computerized device 14 (as represented by updated result information 32), and the next time remote data 26 is generated, it will take into account such progress when creating information for new lessons for adjunct program 28. Thus, coordination is always maintained between computer 12 and remote computerized device 14 as to learning activities carried out on the other device.

As already mentioned, adjunct program 28 is a simplified or limited version of primary program 18. This is so, not only because remote computerized device 14 is not likely to have the computing power of computer 12, but also because the language student will only be performing limited tasks on remote computerized device 14. In practice, for example, if the language student were using remote computerized device 14 while driving it would be undesirable to have him distracted by having to look at a display or to remove a hand from the steering wheel of his vehicle to operate remote computerized device 14. Therefore, many types of language learning tasks would be unavailable to the student under these circumstances. He could, however, be asked to translate or pronounce words, to recite the missing words in a phrase, to carry on a conversation in a language he is studying, or to respond to a multiple-choice question, all in a hands free manner. This could be achieved with the simple voice recognition engine of the type found in cellular telephones. In cases where the student is expected to pronounce words in a foreign language, he could simply be in the given an indication that his response is incorrect, and the correct pronunciation played back. All of this language practice would be focused on words or concepts which presented some difficulty to the student in the primary program. Similarly, since result information 32 will be transferred to main computer 12, when the student once again uses the primary program, he will continue to receive instruction in problem areas that persist.

Figure 2:
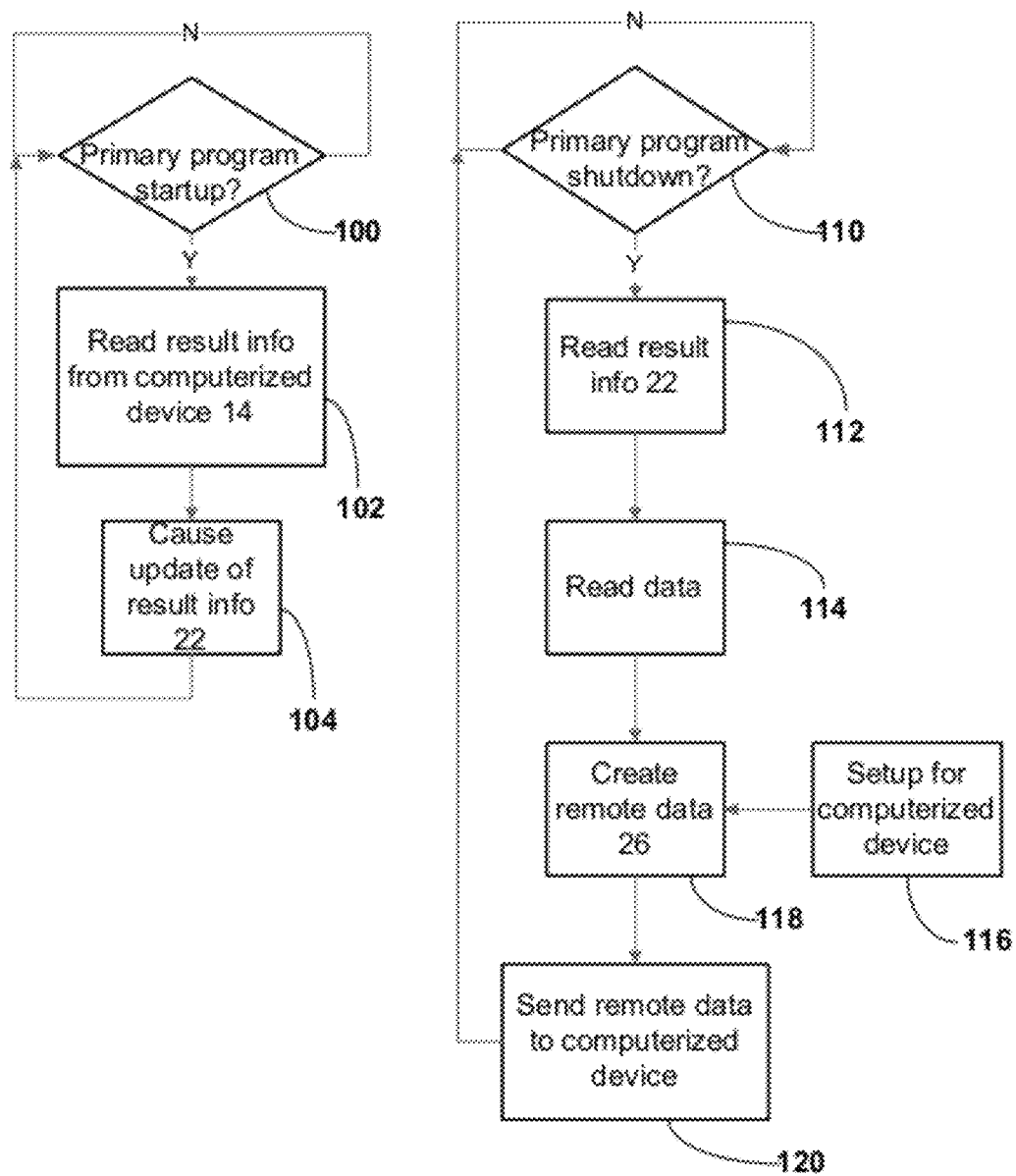
FIG. 2 is a flow chart illustrating operations performed by remote interface program 24 of FIG. 1.

FIG. 2 is a flow chart illustrating operations performed by remote interface program 24. Two primary functions are performed: transfer of information from remote computerized device 14 to computer 12 upon startup of primary program 18; and transfer of information from computer 12 to remote computerized device 14 upon shut down of primary program 18.

At block 100, a test is performed repeatedly to determine whether primary program 18 is starting up (as long as the primary program is not starting up). If it is determined at block 100 that the primary program is starting up, control transfers to block 102, where computer 12 is caused to read the result information 32 from remote computerized device 14. At block 104, computer 12 is caused to update result information 22, based upon the information received from remote computerized device 14. Then, control reverts to block 100 to await the next startup of primary program 18.

At block 110, a test is performed repeatedly to determine whether primary program 18 is shutting down (as long as the primary program is not shutting down). If it is determined at block 110 that the primary program is shutting down, control transfers to block 112, where result information 22 is read with respect to recent learning activity. At block 114, data is read (from data 20) that is relevant to the result information read at block 112. At block 118, the information read at blocks 112 and 114 is utilized to create remote data 26. This is done under the control of set up information 116 for remote computerized device 14. This information would have been created the first time that remote computerized device 14 was used with main computer 12. At block 120, the remote data 26 created at block 118 is sent to remote computerized device 14. Control then reverts to block 110 to await the next shutdown of primary program 18.

The adaptation of learning programs running on remote computerized device 14 may be under the control and instruction of main computer 12. Alternatively, the processing required to determine how to adapt the lessons on remote computerized device 14 may be performed by remote computerized device 14 itself. Either or both of these processes may preferably implement adaptive techniques set forth in copending U.S. patent application Ser. No. 12/052,435, entitled "Adaptive Recall" and assigned to the assignee of the present invention.

It is contemplated that main computer 12 may be used with more than one remote computerized device. Under these circumstances, it would only be necessary for each computerized device to identify itself when communication is established with main computer 12. Remote interface program 24 would have separate setup information for each computerized device and would utilize that information associated with the computerized device that identified itself to main computer 12.

Although the preferred embodiment employs the invention in a language teaching system, the invention finds broad application to performing a computerized task on different computerized devices. For example, suppose an author were writing a report with a word processing program. He runs a spell and grammar check before shutting down his word processor. Making use of the present invention, the results of the spelling and grammar check could be transferred to a handheld computerized device, which the author carries. At his convenience, for example while driving, he could review the results of the spelling and grammar check (e.g. by listening to the computerized device), and he could enter his corrections via a simple voice recognition engine in the computerized device. When the computerized device reconnects with the computer running the word processing program, the author's corrections are entered in his document.

In the language learning environment, if the language learning program on the main computer 12 recognizes, for example, that the user is having trouble with two particular different words, a wireless device can present lessons that focus the user on pronouncing those two words. As this exercise involves simply speaking, it is the most proper exercise to do while driving.

Those skilled in the art will appreciate that, although the remote interface program has been described as separate from the primary program, it could, in practice be a subprogram of the primary program. In the example of the preceding paragraph, the remote interface program could be a module in the word processing program.

In more sophisticated embodiments, the system can generally optimize the time using each of plural devices via a mechanism for storing usage and capability maps. More specifically, the system may be programmed with data indicative of the general capabilities of each device, such as, full or partial keyboard, optimally used hands free or with a keyboard, screen or audio only, etc. Additionally, either via information entered in advance, or via a data compilation/learning algorithm that keeps track of usage patterns, the system may also optionally maintain information indicative of the usage patterns of a particular user, and the user's expected time using each device.

By way of example, the system knows that user A typically uses a handheld device for about an hour a day in the morning, on her drive to work. The handheld device has only an abbreviated keyboard, and it is not really usable because the person is driving during that time. Further, the screen use should be minimized or eliminated so the user is not distracted from driving, with audio prompts and responses dominating any lessons.

Additionally, the same user may use a desktop PC with a full screen and keyboard for about an hour a day in the evening. During this evening time, the user can fully focus the computer and the lesson, and can input items with a mouse, keyboard, or orally.

In the above exemplary scenario, the stored information may then be used to adjust the activities to be presented to a user during learning sessions. For example, consider a lesson presented on the PC which may then, toward the end thereof, be reinforced with learning activities that largely involve the student vocalizing phrases stated by the computer to the student. As this activity largely involves audio only, and no keyboard or screen, the system may determine that it should put off this activity until the following morning, and execute it when the user uses the handheld to practice his language skills. This would allow another, more screen and keyboard intensive activity, such as viewing images and giving responses, or practicing typing in the target language being learned, while the user is using the PC.

As a general rule, the system uses usage patterns and knowledge of the various devices to set up activities that are best done on the particular device it expects the user to use at various times, and based upon what lessons have been done. The system should optimally require the user to enter information about which devices he/she uses, how often per day each might be use, and, if it is not known in advance, the specific capabilities of each such device. The system may also gather device capabilities over a remote connection, or have them prestored in advance. Using the device capabilities, and knowledge of each user's usage patterns with respect to each device, the system can customize and coordinate lessons among the devices so that each device is optimally utilized.

Although preferred embodiments of the invention have been disclosed for illustrative purposes, those skilled in the art will appreciate that many additions, modifications, and substitutions are possible without departing from the scope and spirit of the invention as defined by the company claims.

What is claimed:

1. A method, comprising:
   retrieving a mobile compute device usage pattern including an indication of a context in which a user uses a mobile compute device;
   selecting a first lesson type based on the mobile compute device usage pattern;
   generating, at a main compute device and based on the first lesson type, first control information related to an activity of the first lesson type that can be performed by the user at the mobile compute device in the context and is associated with a task, the activity of the first lesson type being optimized for hands-free operation;
   sending the first control information from the main compute device to the mobile compute device such that the user can complete the activity of the first lesson type using the mobile compute device and in the context;
   receiving, from the mobile compute device and after the activity of the first lesson type has been completed at the mobile compute device, second control information including data associated with performance by the user on the activity of the first lesson type;
   updating information in the main compute device related to performance of the task based upon the second control information; and
   presenting, on a display of the main compute device, an activity of a second lesson type to the user at the main compute device based on (1) the performance by the user on the activity of the first lesson type and (2) main compute device usage pattern data including an indication of a context in which the user uses the main compute device, the activity of the second lesson type being optimized for operation on the main compute device.

2. The method of claim 1, wherein the mobile compute device includes an adjunct program that executes specific aspects of the task.

3. The method of claim 1, wherein the second control information is related to a quality of the user's performance on the activity of the first lesson type.

4. The method of claim 1, further comprising:
   modifying the task based on the second control information.

5. The method of claim 1, wherein the task is a language teaching lesson, the main compute device having stored data defining the language teaching lesson and result information related to the user's progress in the language teaching lesson, the generating the first control information being based on the stored data and the result information such that the activity of the first lesson type is a language learning activity based on the stored data and the result information.

6. The method of claim 5, wherein the mobile complete device executes a simplified version of a main program executing at the main compute device.

7. The method of claim 1, wherein the second control information is related to the user's progress in the activity of the first lesson type.

8. The method of claim 1, wherein the generating includes generating the first control information based at least in part upon a capability of the mobile compute device.

9. The method of claim 1, wherein the mobile compute device usage pattern includes data pertaining to how often the mobile compute device is used, capabilities of the mobile compute device, and under which conditions the user uses the mobile compute device.

10. The method of claim 1, wherein the first lesson type is a hands-free lesson and the context includes driving.

11. The method of claim 1, wherein the presenting includes presenting the activity of the second lesson type to the user at the main compute device based on the mobile compute device usage pattern.

12. An apparatus, comprising:
   a primary program module implemented in a main compute device, the primary program module configured to retrieve mobile compute device usage pattern data including an indication of a context in which a user uses a mobile compute device, the primary program module configured to, based on the mobile compute device usage pattern data, generate first control information related to a hands-flee activity that can be performed by the user on the mobile compute device in the context and is associated with a task, the primary program module configured to send the first control information to the mobile compute device such that the user can complete the hands-free activity on the mobile compute device and in the context,
   the primary program module configured to receive, from the mobile compute device, second control information including data associated with performance by the user on the hands-free activity, the primary program module configured to retrieve main compute device usage pattern data including an indication of a context in which the user uses the main compute device, the primary program module configured to, based on the main compute device usage pattern data, present, on a display of the main compute device, a hands-on activity to the user at the main compute device based on the performance by the user on the hands-free activity.

13. The apparatus of claim 12, wherein the main compute device updates result information based on the second control information.

14. The apparatus of claim 12, wherein the primary program module is further configured to select the hands-free activity based at least in part upon a capability of the mobile compute device.

15. The apparatus of claim 12, wherein the task is a language teaching lesson, the main compute device storing data related to the language teaching lesson and result information related to the user's performance in the language teaching lesson, the primary program module interacting with the mobile compute device to have the user perform the hands-free activity at the mobile compute device and in the context in response to the user's performance in the language teaching lesson.

* * * * *